(12) United States Patent
Tammera

(10) Patent No.: US 9,440,212 B2
(45) Date of Patent: Sep. 13, 2016

(54) INTEGRATED CYCLONE ASSEMBLY

(71) Applicant: Robert Frank Tammera, Warrenton, VA (US)

(72) Inventor: Robert Frank Tammera, Warrenton, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 124 days.

(21) Appl. No.: 14/097,522

(22) Filed: Dec. 5, 2013

(65) Prior Publication Data

US 2015/0158002 A1    Jun. 11, 2015

(51) Int. Cl.
| | | |
|---|---|---|
| *B01D 45/12* | (2006.01) | |
| *B01J 8/38* | (2006.01) | |
| *B04C 5/13* | (2006.01) | |
| *B04C 5/26* | (2006.01) | |
| *B01J 8/18* | (2006.01) | |
| *B01J 8/00* | (2006.01) | |
| *C10G 11/18* | (2006.01) | |
| *B01D 46/16* | (2006.01) | |

(52) U.S. Cl.
CPC ............... *B01J 8/382* (2013.01); *B01D 45/12* (2013.01); *B01J 8/0055* (2013.01); *B01J 8/18* (2013.01); *B04C 5/13* (2013.01); *B04C 5/26* (2013.01); *C10G 11/18* (2013.01); *B01D 46/16* (2013.01)

(58) Field of Classification Search
CPC ......... B01J 8/0055; B01J 8/388; B04C 9/00; C10G 11/18; B01D 45/12
See application file for complete search history.

(56) References Cited

U.S. PATENT DOCUMENTS 4,226,708 A    10/1980 McCartney
4,426,212 A     1/1984 Zacher
(Continued)

FOREIGN PATENT DOCUMENTS

CN    201006498 Y    1/2008
CN    202002091 U    10/2011
(Continued)

OTHER PUBLICATIONS

PCT Application No. PCT/US2014/061300, Communication from the International Searching Authority, PCT Form PCT/ISA/210, dated Jan. 29, 2015, 10 pages.
(Continued)

*Primary Examiner* — Dung H Bui
(74) *Attorney, Agent, or Firm* — Andrew T. Ward

(57) ABSTRACT

Integrated primary and secondary cyclone assembly includes a secondary cyclone having an outlet tube extending therefrom and a primary cyclone operatively coupled with the secondary cyclone. The outlet tube has a cross dimension and length and is configured to be secured to a pressure vessel closure head to support the secondary cyclone therefrom. The primary cyclone has a tubular support member extending therefrom. The tubular support member is aligned substantially parallel with and has a length similar to the outlet tube of the secondary cyclone and is configured to be joined to the pressure vessel closure head to support the primary cyclone therefrom.

5 Claims, 9 Drawing Sheets

(56) References Cited

U.S. PATENT DOCUMENTS

| | | |
|---|---|---|
| 4,547,341 A | 10/1985 | Weber |
| 4,606,814 A | 8/1986 | Haddad |
| 4,687,497 A | 8/1987 | Owen et al. |
| 5,453,255 A | 9/1995 | Shaw et al. |
| 7,841,477 B2 | 11/2010 | Hansen |
| 8,349,170 B2 | 1/2013 | Tammera et al. |
| 2006/0049082 A1 | 3/2006 | Niccum et al. |
| 2010/0065669 A1 | 3/2010 | Coles et al. |
| 2010/0269862 A1 | 10/2010 | Van Staden |
| 2011/0240526 A1 | 10/2011 | Tammera et al. |
| 2011/0315603 A1 | 12/2011 | Skoulidas et al. |
| 2012/0107189 A1 | 5/2012 | Yang et al. |
| 2013/0031883 A1 | 2/2013 | Werchowski |

FOREIGN PATENT DOCUMENTS

| | | |
|---|---|---|
| CN | 202667011 U | 1/2013 |
| WO | 2009030241 A1 | 3/2009 |

OTHER PUBLICATIONS

PCT Application No. PCT/US2014/061302, Communication from the International Searching Authority received in co-pending, co-owned related U.S. Appl. No. 14/097,631, Form PCT/ISA/220, dated Feb. 24, 2015, 11 pages.

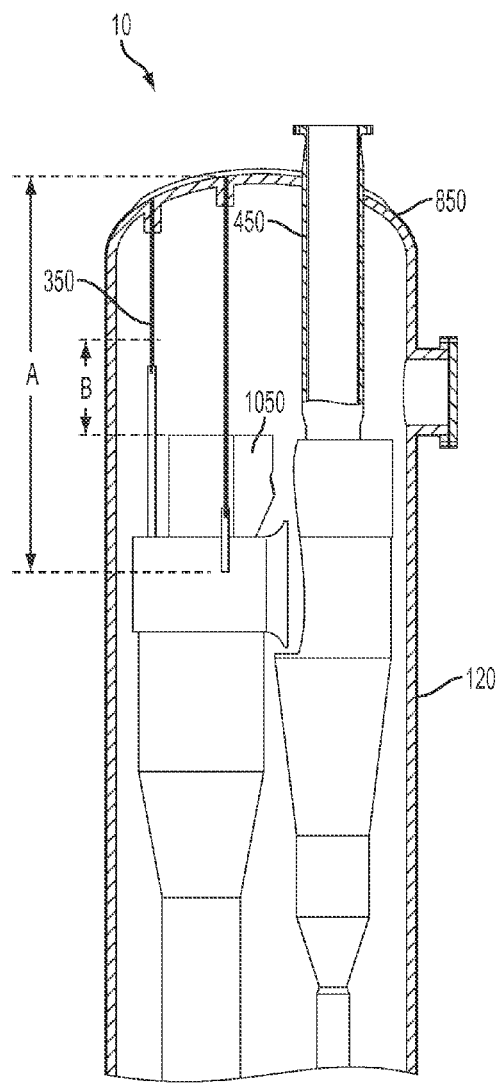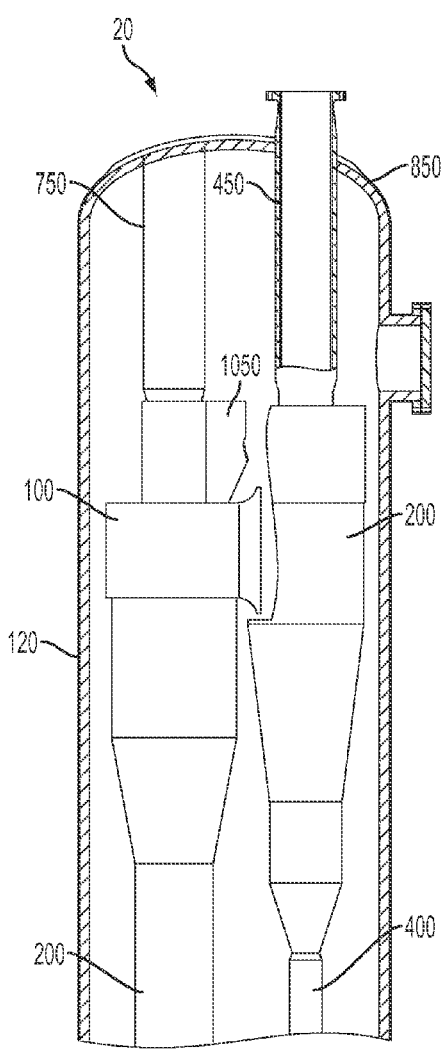
FIG. 10
PRIOR ART
FIG. 11

INTEGRATED CYCLONE ASSEMBLY

BACKGROUND

1. Field of the Disclosed Subject Matter

The present disclosed subject matter relates to cyclone assemblies, and particularly stabilizer assemblies to secure and stabilize cyclone assemblies within a multi-phase reaction bed vessel.

2. Description of Related Art

Fluid catalytic cracking (FCC) processes are used for petroleum and petrochemical conversion processes. These processes can provide efficient and selective catalytic cracking of hydrocarbon-containing feedstock. For example, small catalyst particles can be fluidized and mixed with a feedstock by intimate contact under thermally active conditions to generally produce lower molecular weight "cracked" products. FCC processes are beneficial due at least in part to the ability to continuously recycle and regenerate the spent catalysts and to process large volumes of hydrocarbon-containing feedstock.

In FCC processes, higher molecular weight feeds contact fluidized catalyst particles, most advantageously in the riser reactor of the fluidized catalytic cracking unit. Contact between feed and catalyst can be controlled according to the type of product desired. In catalytic cracking of the feed, reactor conditions, including temperature and catalyst circulation rate, can be adjusted to increase formation of the desired products and reduce the formation of less desirable products, such as light gases and coke.

Various fluidized catalytic cracking reactor riser and reactor vessel designs can be utilized. For example, certain fluidized catalytic cracking reactors utilize a short contact-time cracking configuration. With this configuration, the catalyst contacts the fluidized catalytic cracker feedstream for a limited time in order to reduce excessive cracking, which can result in the increased production of less valued products such as light hydrocarbon gases, as well as increased coking deposition on the cracking catalysts.

Certain fluidized catalytic cracking configurations utilize a reactor riser cracking configuration wherein the catalyst can contact the fluidized catalytic cracker feedstock in a reactor riser, and the catalyst and the hydrocarbon reaction products can be separated shortly after the catalyst and hydrocarbon mixture flows from the reactor riser into the fluidized catalytic cracking reactor. Many different fluidized catalytic cracking reactor designs are known. For example, certain designs utilize mechanical cyclones internal to the reactor to separate the catalyst from the hydrocarbon reactor products. This separation process can reduce post-riser reactions between the catalyst and the hydrocarbons as well as separate the cracked hydrocarbon products for further processing from the spent catalyst, which can be regenerated and reintroduced into the reaction process.

Mechanical cyclone assemblies generally can include a plurality of cyclones joined together and secured to the pressure vessel of the reactor. An insufficiently balanced and supported cyclone system can produce a vibration frequency, which can promote metal fatigue and lead to mechanical failure. A plurality of flat plate hanger straps typically are utilized to support one or more of the cyclones to the pressure vessel. However, the conventional hanger strap support system can be challenging to engineer, particularly to provide support points for uniformly balancing the cyclone system. An unbalanced cyclone system can cause an axial tilt of one or more cyclones, which can depreciate the overall cyclone system stability and performance during the system run cycle. Additionally, an increased length of the hanger straps can lead to increased thermal expansion during system operation. Hanger straps exceeding a desired length can lead to over-expansion of one or more of the cyclones, which can cause an axial tilt of the cyclone system and thus inefficiencies.

Cyclone systems can be further stabilized from vibration by restraining the dipleg conduits of the cyclones from movement. In practice, cyclone pairs can be joined to other cyclone pairs by one or more braces. For example, braces can be used to join three cyclones in a triangular fashion. However, certain cyclone arrangements can be unsuitable for such a triangular integration, for example if fewer than three cyclones are employed. Furthermore, space limitations and interference from other hardware can restrict the area available to form a desired bracing arrangement. In addition, non-uniform thermal movement between the pressure vessel shell and the cyclone system can reduce the effectiveness of such a bracing arrangement.

As such, there remains a need for improved assemblies and methods to secure and stabilize cyclone assemblies in a reaction bed vessel.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes an integrated primary and secondary cyclone assembly. The assembly includes a secondary cyclone having an outlet tube extending therefrom and a primary cyclone operatively coupled with the secondary cyclone. The outlet tube has a cross dimension and length and is configured to be secured to a pressure vessel closure head to support the secondary cyclone therefrom. The primary cyclone has a tubular support member extending therefrom. The tubular support member is aligned substantially parallel with and has a length similar to the outlet tube of the secondary cyclone and is configured to be joined to the pressure vessel closure head to support the primary cyclone therefrom.

For example and as embodied here, the tubular support member can have a central axis aligned along a concentric axis of a centroid of the primary cyclone. The tubular support member can be formed from a pipe or a rolled plate. Furthermore, the tubular support member can have a cross dimension similar to the cross dimension of the outlet tube. Additionally or alternatively, the tubular support member can have a wall thickness similar to a wall thickness of the outlet tube.

Furthermore, and as embodied here, the tubular support member can have a coefficient of thermal expansion similar to a coefficient of thermal expansion of the outlet tube. The tubular support member can be configured to be joined to a plenum floor of the pressure vessel closure head.

In some embodiments, the assembly can include at least one hinge plate configured to join the tubular support member to a plenum skirt of the pressure vessel closure head. Additionally or alternatively, the primary cyclone can be configured to be joined to the pressure vessel closure head free of hangar straps.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

BRIEF DESCRIPTION OF THE DRAWINGS

FIG. 10 is a partial cross-sectional side view of the conventional cyclone assembly of FIG. 1, for purpose of comparison with the exemplary integrated primary and secondary cyclone assembly of FIG. 9.

FIG. 11 is a partial cross-sectional side view of the exemplary integrated primary and secondary cyclone assembly of FIG. 9.

DETAILED DESCRIPTION OF THE PREFERRED EMBODIMENT

Figure 1:
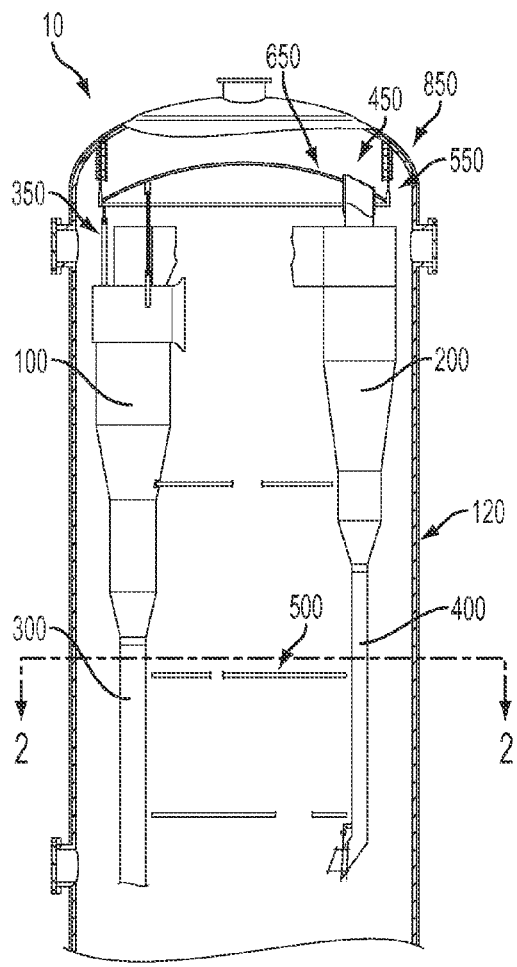
FIG. 1 is a partial cross-sectional view illustrating a conventional cyclone assembly for purpose of illustration and comparison to the disclosed subject matter.

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

The apparatus and methods presented herein can be used for securing and/or stabilizing any of a variety of suitable cyclone systems, including any cyclone dust separator systems utilizing a support and/or stabilizer system to overcome operating conditions in a reactor bed pressure vessel. For purpose of illustration only and not limitation, and as embodied here, the reactor bed vessel can be a fluidized bed reactor or a packed bed reactor having one or more cyclone systems for use in separating hydrocarbons from a catalyst. Additional details regarding fluidized bed reactors and other aspects of fluidized catalytic cracking (FCC) processes are provided in U.S. Pat. No. 8,349,170 and U.S. Patent Application Publication Nos. 2011/0240526 and 2011/0315603, each of which are incorporated by reference herein in its entirety.

In accordance with one aspect of the disclosed subject matter herein, the integrated cyclone stabilizer assembly generally includes an upper annular ring to be disposed at an upper portion of the cyclone, a lower annular ring to be disposed at a lower portion of the cyclone, and a plurality of struts extending between the upper annular ring and the lower annular ring. The upper annular ring has a plurality of hinge members extending radially therein to support the upper portion of the cyclone therefrom. The lower annular ring has a plurality of hinge members extending radially therein to support the lower portion of the cyclone therefrom.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the cyclone assembly in accordance with the first aspect of the disclosed subject matter are shown in FIGS. 3-8. While the present disclosed subject matter is described with respect to cyclone assemblies for a bed reactor in a fluid catalytic cracking process, one skilled in the art will recognize that the disclosed subject matter is not limited to the illustrative embodiment, and that the stabilizer assembly can be used to secure and/or stabilize any suitable component of a suitable chamber.

Figure 2:
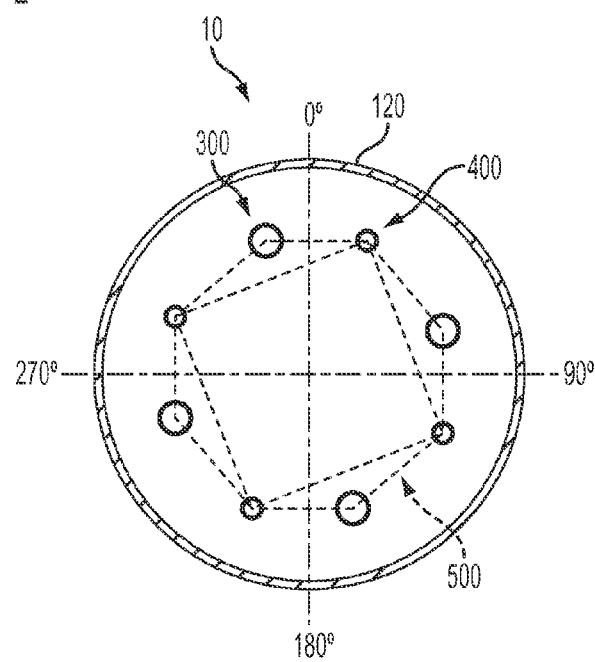
FIG. 2 is a partial cross-sectional top view illustrating the cyclone assembly taken along line 2-2 of FIG. 1.

For purpose of comparison to and illustration of the disclosed subject matter, reference is first made to a conventional cyclone assembly illustrated in FIGS. 1-2. As depicted, the conventional cyclone assembly 10 includes a plurality of similarly-configured primary cyclone 100 and secondary cyclone 200 pairs systematically joined. Each pair of the primary cyclone 100 and secondary cyclone 200 can be suspended from an upper portion of the pressure vessel, wherein each primary cyclone 100 and secondary cyclone 200 can include a dipleg conduit 300, 400, respectively. Operating conditions within the vessel, including vibration due to cyclone operation and thermal movements due to heating and cooling can cause the cyclone assembly 10 to sway off its natural axis. As such, to reduce or prevent unwanted movement of the cyclone assembly 10, the dipleg conduit 300 of a primary cyclone 100 can be joined to the dipleg conduit 400 of two secondary cyclones 200 using braces 500 in a triangular bracing pattern. For example, FIG. 2 illustrates a bracing pattern utilized to brace a cyclone assembly of four pairs of primary and secondary cyclone dipleg conduits 300, 400. However, this technique is ineffective, for example if the system includes fewer than three cyclone pairs.

Figure 13:
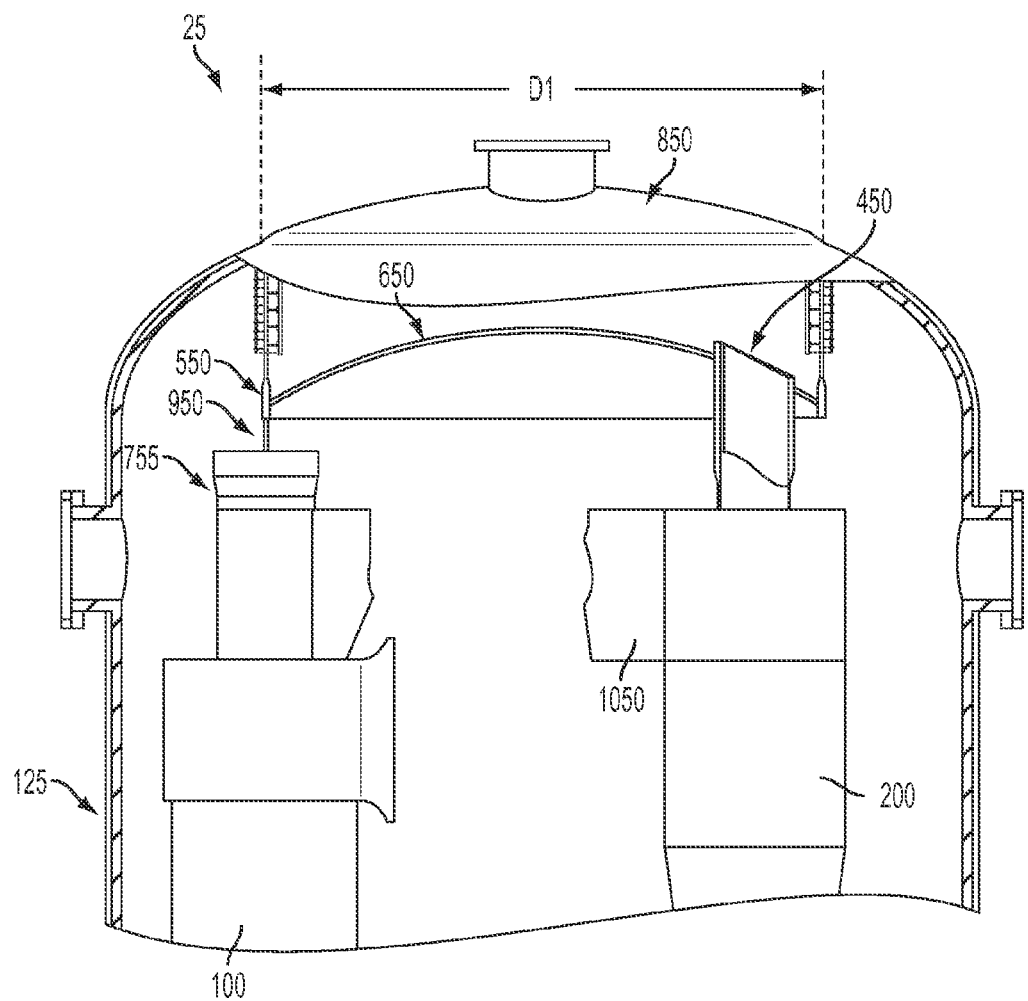
FIG. 13 is a cross-sectional view of another exemplary integrated primary and secondary cyclone assembly according to the disclosed subject matter.

As further depicted in FIG. 1, the primary cyclone 100 and the secondary cyclone 200 can be integrated, for example, by weld-sealing, which can establish a continuous fluid process connection between the primary cyclone 100 and the secondary cyclone 200. The secondary cyclone 200 is supported by its conventional outlet tube 450 through an opening in the plenum chamber floor 650, as illustrated in FIGS. 10 and 13. The primary cyclone 100, however, is conventionally supported by a plurality of flat hanger straps 350 disposed proximate the exterior cyclone barrel of the primary cyclone 100 and joined to the nearest pressure vessel hardware surfaces, which can include one or more of the plenum skirt 550 and the plenum chamber floor 650.

Figure 3:
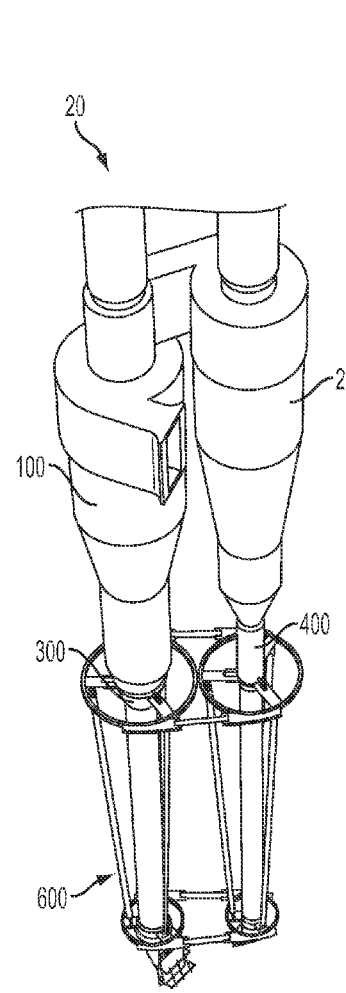
FIG. 3 is an elevated perspective view illustrating an exemplary integrated cyclone stabilizer assembly according to the disclosed subject matter.
Figure 4:
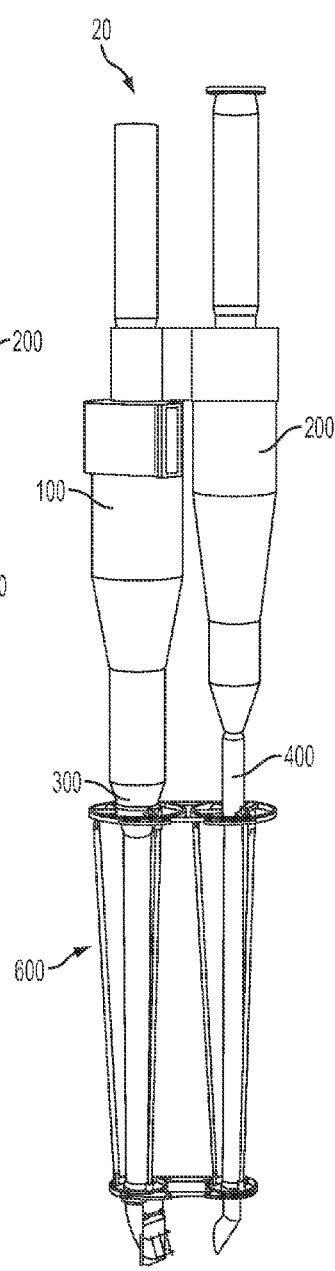
FIG. 4 is a side view of the cyclone stabilizer assembly of FIG. 3.
Figure 5:
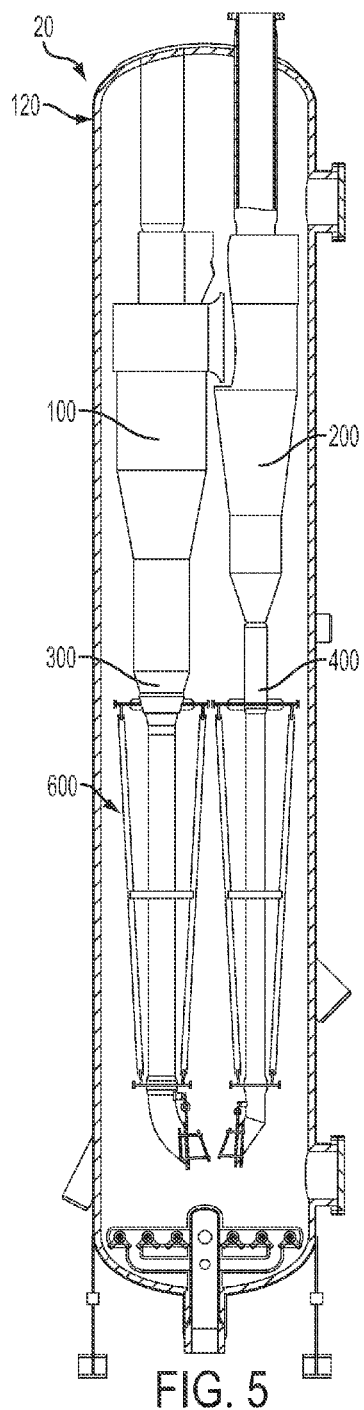
FIG. 5 is a cross-sectional side view illustrating an exemplary cyclone assembly in a reactor bed vessel according to the disclosed subject matter.

According to one aspect of the disclosed subject matter, with reference to FIGS. 3-5, an integrated cyclone stabilizer 600 for a cyclone assembly 20 is provided. As shown in FIGS. 3-5, the integrated cyclone stabilizer 600 can be utilized to integrate a single pair of primary and secondary cyclones 100, 200. The integrated cyclone stabilizer 600 can overcome vibration due to operating cycle frequencies and can provide uniform thermal movement. The integrated cyclone stabilizer 600 according to the disclosed subject matter thus can be shop fabricated and can be made free of attachments to neighboring cyclone assemblies or the pressure vessel shell 120. The components of integrated cyclone stabilizer 600 can be formed from flat plate, rolled plate and/or standard straight pipe of suitable materials, such as carbon steel or stainless steel plate, and assembled together using suitable techniques, such as welding or the like. Multiple subassemblies 700 can be formed concentric to each cyclone 100, 200, and can be further joined to form a robust architecture, as discussed further herein.

Figure 6:
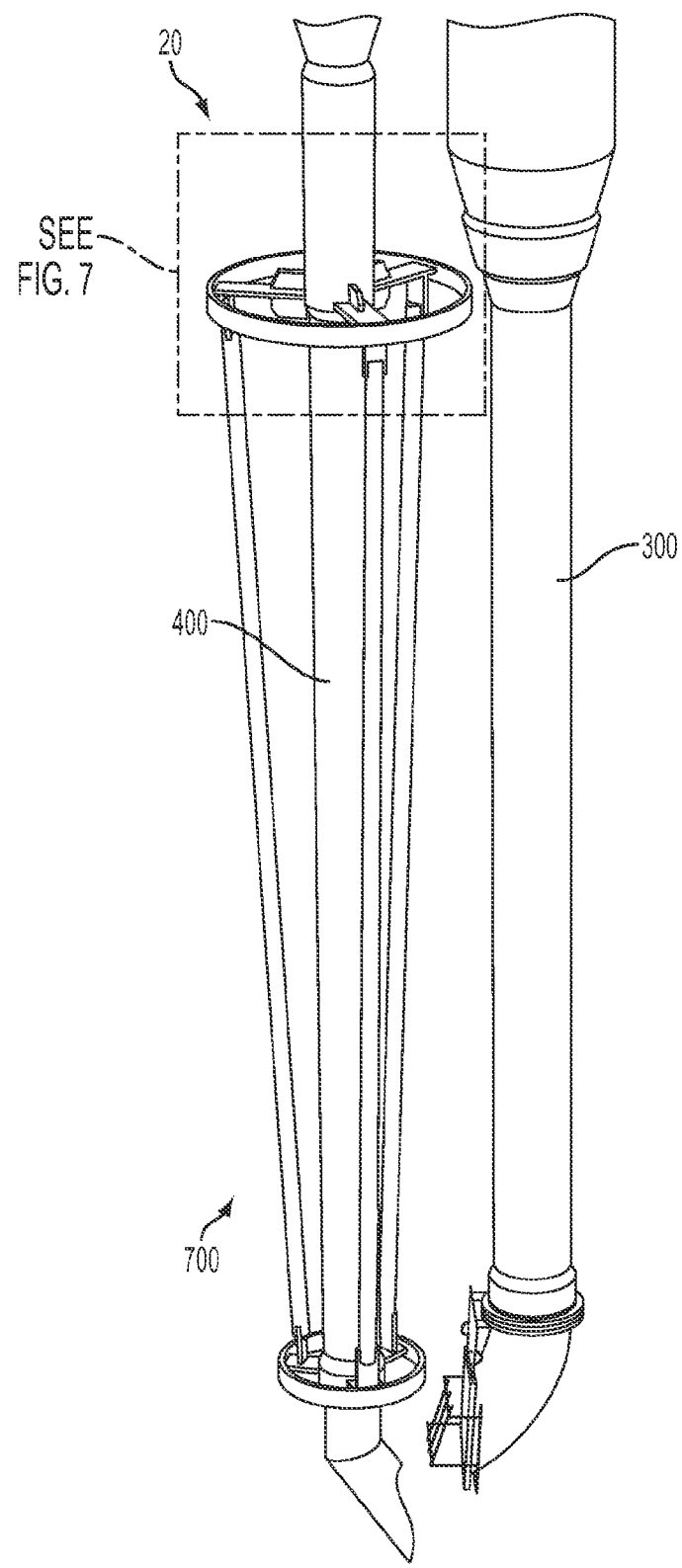
FIG. 6 is a detail side view of a lower portion of the cyclone stabilizer assembly of FIG. 3.
Figure 7:
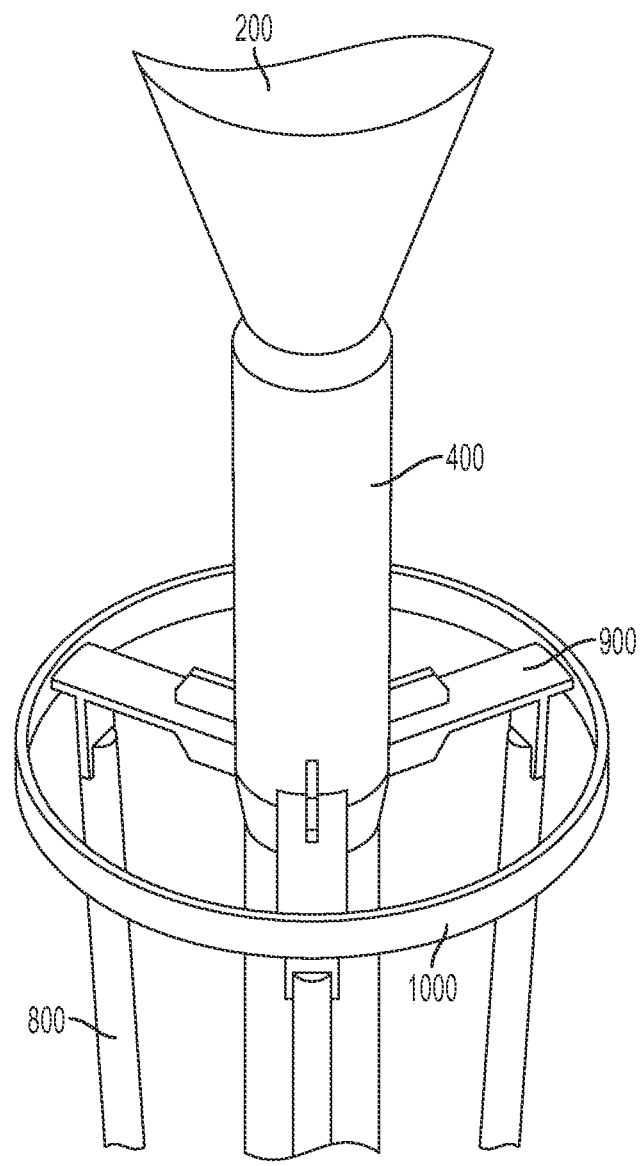
FIG. 7 is an enlarged detail perspective view of region 7 of FIG. 6.

Referring now to FIGS. 6-7, for example and as previously noted, each subassembly 700 can include an upper annular ring 1000, a lower annular ring 1005 and a plurality of struts 800 extending therebetween. For each annular ring 1000, 1005, one or more hinge members 900 can extend between and be secured to the annular ring and the dipleg conduit 300, 400 of the corresponding cyclone 100, 200. For example, and as embodied in FIGS. 6 and 7, each subassembly 700 can include three equally-spaced apart hinge members 900 associated with each annular ring. Although each subassembly embodied herein is depicted with two similarly-configured tiers of hinge members and rings, additional rings can be provided along the length of the cyclone as described herein to form additional tiers. The number of and size of the ring assemblies generally will depend upon the size and configuration of the cyclone. For example and as embodied herein, top ring 1000 can have a diameter approximately 30% larger, and in some embodiments up to about 40% larger, than bottom ring 1005. Furthermore, and as embodied herein, the flat hinge plates 900 can be substantially equal in size at least for each ring assembly, or throughout the subassembly as appropriate. Similarly, tripod struts 800 can be sized and evenly spaced to join to the upper and lower rings 1000, 1005. As embodied herein, struts 800 can be substantially aligned with hinges 900 of each ring 1000, 1005, as shown for example in FIG. 6. The tripodal configuration of the struts 800 thus are configured to restrict or prevent the offset of the dipleg conduits 300, 400 from their central axis.

Figure 8:
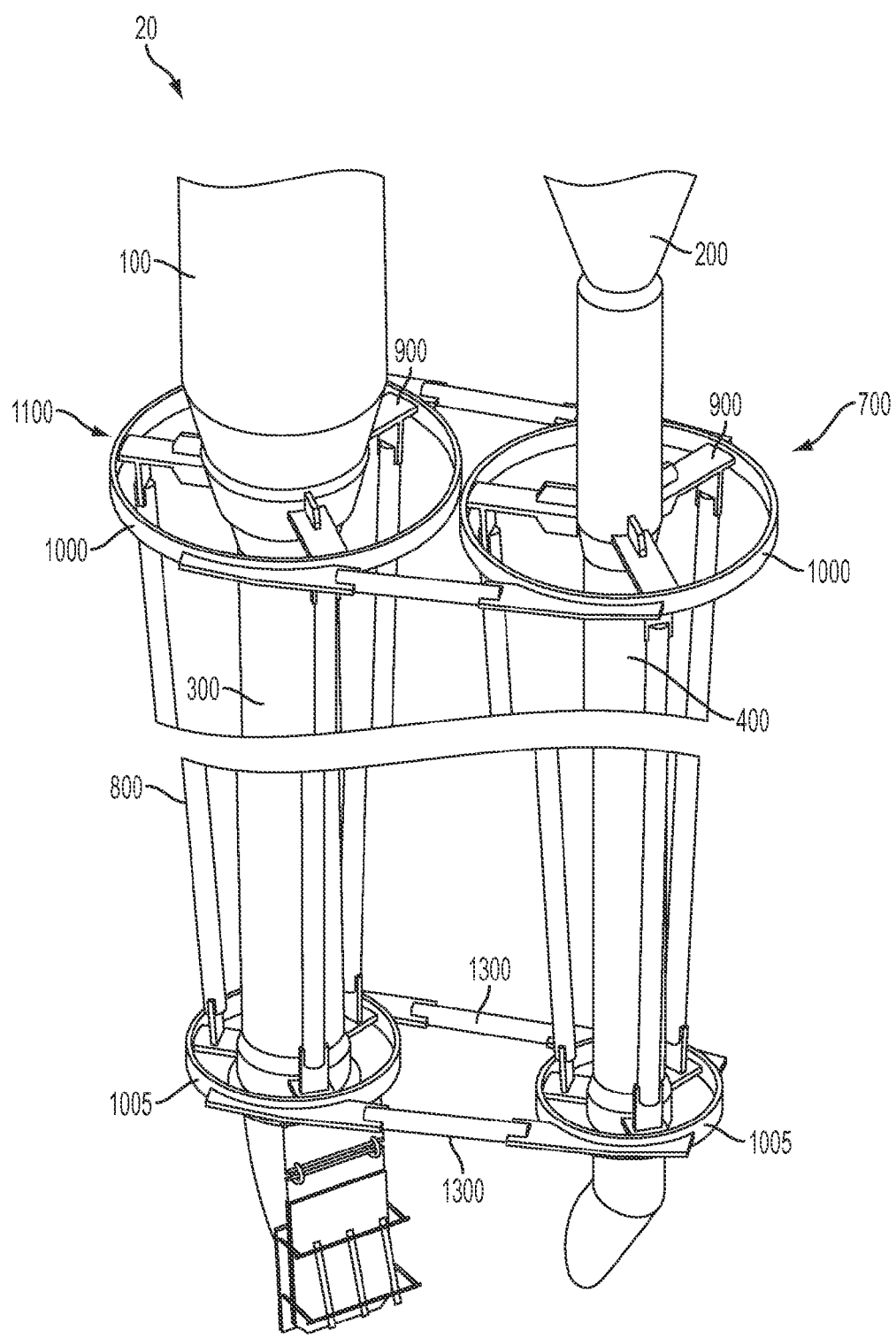
FIG. 8 is a partial perspective view of the cyclone stabilizer assembly of FIG. 3, with portions removed.

With reference now to FIG. 8, a pair of subassemblies 700, 1100 can be combined to form the integrated cyclone stabilizer 600. In similar fashion to subassembly 700 described herein, a similarly-configured subassembly 1100 is formed about dipleg conduit 300 of the primary cyclone 100. Each of subassemblies 700, 1100 can be attached to its respective dipleg 300, 400. Furthermore, the pair of subassemblies 700, 1100 can be joined together, such as by one or more connecting members 1300. As embodied herein, for illustration and not limitation, two connecting members 1300 can be formed from straight horizontal pipe and welded at points tangential to each of the adjacent rings 1000, 1005 of the subassemblies 700, 1100. The integration of the subassemblies 700, 1100 forming the integrated cyclone assembly 600 provides an additional level of rigid architecture, to further prevent axial deviation of the cyclone diplegs 300, 400 but allow for thermal radial and downward expansion movement thereof.

The integrated cyclone stabilizer according to the disclosed subject matter provides a compact architecture to integrate a pair of primary and secondary cyclone bodies and their respective dipleg conduits without the need for additional supports. The stabilizer can join the cyclone assembly in a manner that can restrict or prevent axial movement at the end of the diplegs while allowing for overall downward movement due at least in part to thermal expansion. Furthermore, and as embodied herein, the integrated cyclone stabilizer according to the disclosed subject matter can be provided free of attachment to the pressure vessel shell or any other supports points or brace attachment points. As such, the integrated cyclone stabilizer can provide a self-contained union of a single primary and secondary cyclone pair.

Additionally, and as embodied herein, the integrated cyclone stabilizer can be entirely shop fabricated and pre-assembled in the cyclone system prior to installation into the pressure vessel. The integrated cyclone stabilizer can also be formed so as to not impede customary fabrication techniques of the pressure vessel or impact normal internal vessel inspection access or limit maintenance procedures. As such, the compact design of the integrated cyclone stabilizer can be integrated to avoid internal hardware interferences. In addition, the reduced mechanical complexity of the integrated cyclone stabilizer can reduce fabrication, installation, and unit maintenance and material costs.

In accordance with another aspect of the disclosed subject matter, an integrated primary and secondary cyclone assembly is provided. The assembly includes a secondary cyclone having an outlet tube extending therefrom and a primary cyclone operatively coupled with the secondary cyclone. The outlet tube has a cross dimension and length and is configured to be secured to a pressure vessel closure head to support the secondary cyclone therefrom. The primary cyclone has a tubular support member extending therefrom. The tubular support member is aligned substantially parallel with and has a length similar to the outlet tube of the secondary cyclone and is configured to be joined to the pressure vessel closure head to support the primary cyclone therefrom.

Figure 9:
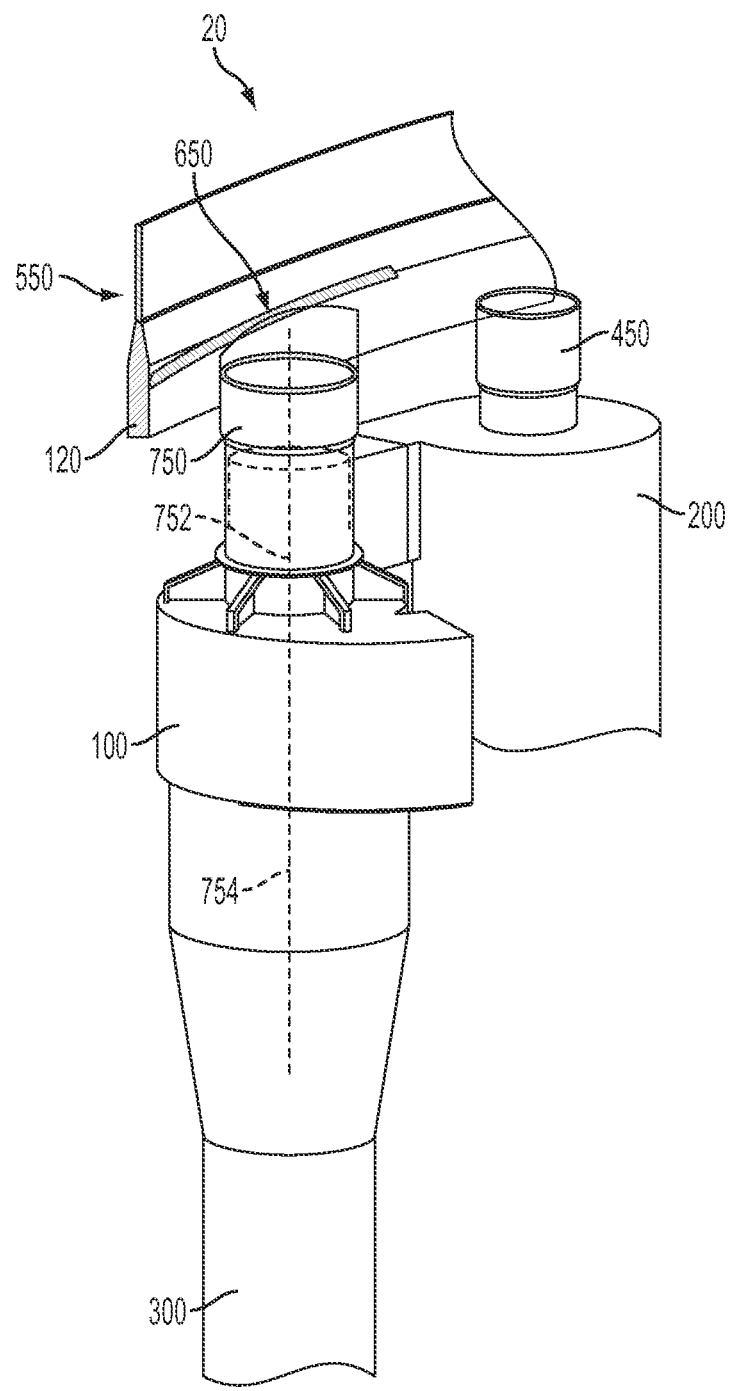
FIG. 9 is a partial elevation view of an exemplary integrated primary and secondary cyclone assembly according to another aspect of the disclosed subject matter.

With reference now to FIG. 9, for purpose of illustration and not limitation, the integrated cyclone assembly 20 includes primary and secondary cyclones 100, 200 joined to the pressure vessel 120. Particularly, the secondary cyclone 200 is supported by its outlet tube 450 extending from the secondary cyclone 200 and secured to the pressure vessel closure head through an opening in the plenum chamber floor 650. However, as is well recognized, the primary cyclone 100 does not include such an outlet tube. As such, and as embodied herein, a tubular support member 750 is provided extending from the primary cyclone 100 and coupled to a proximate surface of the plenum chamber floor 650, if provided. However, it is recognized that the assembly herein can likewise be used in a vessel with no internal plenum. The tubular support member 750 can have a central axis 752 aligned along the concentric axis 754 of the primary cyclone 100. Furthermore, and as described below, the tubular support 750 is selected of a size and material to mirror that of the outlet tube 450 of the secondary cyclone 200. In this manner, the support for each cyclone 100, 200 will generally act in union with regard to vibration and thermal expansion. The integrated cyclone assembly 20 with the tubular support member 750 can thus provide suitable support for the integrated primary and secondary cyclones 100, 200, and can allow for improved thermal movement of the cyclones while utilizing less material.

With reference now to FIGS. 10-11, the conventional cyclone assembly 10 of FIG. 1 is shown side-by-side with the integrated cyclone assembly 20 of FIG. 9 according to the disclosed subject matter for purpose of illustration and comparison. As depicted herein, the conventional assembly 10 and the integrated cyclone assembly 20 are each joined to the pressure vessel closure head 850, for example in a pressure vessel 120 that does not utilize an internal plenum chamber. As shown in FIG. 10, in the conventional cyclone assembly 10, hanger straps 350 are welded to the primary cyclone 100 and to the pressure vessel closure head 850. By comparison, the integrated cyclone assembly 20 includes the tubular support 750 secured to the pressure vessel closure head 850. The tubular support 750 is sized to allow for improved thermal movement of the cyclones while utilizing less material, as discussed further herein. The tubular support member 750 can be welded to the inside surface of the pressure vessel closure head 850. Additionally, the pressure vessel closure head 850 can include refractory insulation formed from materials that are common in industry practice to prevent elevated material temperatures at the attachment point of the tubular support member 750.

Figure 12:
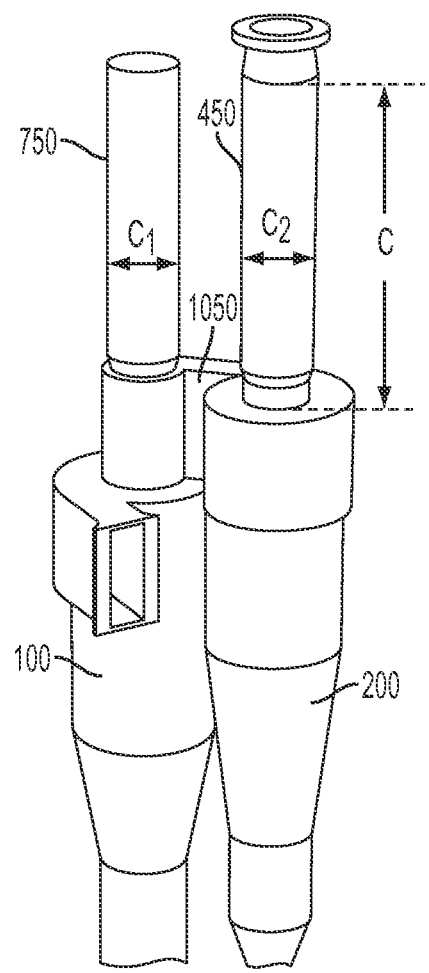
FIG. 12 is a partial detail perspective view of a portion of the exemplary integrated primary and secondary cyclone assembly of FIG. 9.

With reference now to FIGS. 10 and 12, the conventional cyclone assembly 10 of FIG. 10 can be compared with the integrated cyclone assembly 20 as depicted in FIG. 12, for purpose of illustration and comparison of additional features of the disclosed subject matter. As illustrated in FIG. 10, the use of conventional hanger straps 350 requires configurations where the actual hanger strap 350 length A is greater than a desired hanger strap 350 length B. That is, a desired hanger strap 350 length B can be measured between the cross-over duct 1050 of the primary cyclone 100 and the support surface of the pressure vessel 850, and thus such a desired length can be within a range of about 12 inches to 24 inches. FIG. 10 illustrates the conventional cyclone assembly 10 having a hanger strap 350 length A that is longer than the desired length B, and as such can be unstable, including having an unsuitable response to thermal expansion of the primary cyclone 100 and the hanger straps 350.

By comparison, as shown in FIG. 12, the tubular support member 750 can have a length C that is approximately equal in length to the outlet tube 450 configured to support the secondary cyclone 200 within the vessel shell 120. As such, the integrated primary and secondary cyclones 100, 200 can have a similar, parallel movement due to thermal expansion of the tubular support member 750 and the outlet tube, and thus can have improved stability and support during operation of the cyclones. In addition, and as embodied herein, the tubular support member 750 can have a cross-dimension c1 that is approximately equal to a cross-dimension c2 of the outlet tube 450 of the secondary cyclone. Furthermore, and as embodied herein, the tubular support member 750 can be formed from a material having a similar coefficient of thermal expansion as that of the outlet tube 450. Preferably, the member 750 and the vessel shell 120 are formed from the same material to avoid uneven thermal expansion and contraction between these components.

Referring now to FIG. 13, a further embodiment of a cyclone assembly 25 according to the disclosed subject matter is provided. As shown in FIG. 13, a tubular support member 755 can join the primary cyclone 100 to the plenum skirt 550 of the pressure vessel 125 using a flexible hinge 950 of suitable material, such as stainless steel or carbon steel. Such a configuration can be utilized, for example and without limitation, to provide a tubular support member 755 for the primary cyclone 100 in a pressure vessel having a reduced diameter D1, wherein the tubular support member 755 cannot be joined directly to the pressure vessel head 850. In some configurations, the smaller diameter plenum chamber can allow for reduced costs in material, fabrication, installation and operational expenses.

The tubular support members 750, 755 according to the disclosed subject matter can be fabricated, for purpose of illustration and not limitation, from a standard pipe or a metal sheet rolled to form the desired diameter and cut to the desired length. Furthermore, and as embodied herein, the tubular support members 750, 755 can be formed having a wall thickness that is similar to the wall thickness of the outlet tube 450. In this manner, the tubular support members 750, 755 can be entirely shop fabricated and pre-assembled to the cyclone assembly 20, 25 prior to installation in to the pressure vessel 120, 125. Furthermore, the reduced size of the tubular support members 750, 755 compared to hanger straps 350 can allow for increased space within the pressure vessel 120, 125, for example to provide increased space for inspection access and/or maintenance procedures. As such, the compact design of the tubular support members 750, 755 can be integrated to avoid internal hardware interferences. In addition, the reduced mechanical complexity of the tubular support members 750, 755 can reduce fabrication, installation, and unit maintenance and material costs.

The assembly described herein can be utilized in any reactor system or process for petroleum refining or petrochemical refinement utilizing fluid bed technology and cyclone systems. It is contemplated that the presently disclosed subject matter may be used in connection with various fluid bed technologies including, for example, but not limited to (i) the preparation of at least one of phthalic anhydride, vinyl acetate, acrylonitrile, ethylene dichloride, chloromethane, maleic anhydride, polyethylene, polypropylene and o-cresol; (ii) Fischer-Tropsch synthesis; (iii) resid cat cracking; (iv) the conversion of at least one methanol to olefins (MTO), methanol to aromatics (MTA), methanol to paraxylene (MTP), methanol to gasoline (MTG), Methanol to diesel (MTD), syngas to olefins, syngas to aromatics, syngas to paraxylene, coal to olefins. coal to aromatics, Benzene and/or Toluene Methylation with Methanol or DME to Aromatics, Benzene and/or Toluene Methylation with Methanol or DME to Paraxylene, Toluene Ethylation to MEB (methylethylbenzene), Benzene Ethylation to DEB (Diethylbenzene), Biomass to Olefins, Biomass to Aromatics, and Biomass to Gasoline.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

Additional Embodiments

Embodiment 1

An integrated primary and secondary cyclone assembly, comprising: a secondary cyclone having an outlet tube extending therefrom, the outlet tube having a cross dimension and length, the outlet tube configured to be secured to a pressure vessel closure head to support the secondary cyclone therefrom; and a primary cyclone operatively coupled with the secondary cyclone, the primary cyclone having a tubular support member extending therefrom, the tubular support member aligned substantially parallel with and having a length similar to the outlet tube of the secondary cyclone and configured to be joined to the pressure vessel closure head to support the primary cyclone therefrom.

Embodiment 2

The assembly according to Embodiment 1, wherein the tubular support member has a central axis aligned along a concentric axis of a centroid of the primary cyclone.

Embodiment 3

The assembly according to Embodiments 1 or 2, wherein the tubular support member is formed from a pipe or a rolled plate.

Embodiment 4

The assembly according to anyone of the preceding Embodiments, wherein the tubular support member has a cross dimension similar to the cross dimension of the outlet tube.

Embodiment 5

The assembly according to anyone of the preceding Embodiments, wherein the tubular support member has a wall thickness similar to a wall thickness of the outlet tube.

Embodiment 6

The assembly according to anyone of the preceding Embodiments, wherein the tubular support member has a coefficient of thermal expansion similar to a coefficient of thermal expansion of the outlet tube.

Embodiment 7

The assembly according to anyone of the preceding Embodiments, wherein the tubular support member is configured to be joined to a plenum floor of the pressure vessel closure head.

Embodiment 8

The assembly according to anyone of the preceding Embodiments, further comprising at least one hinge plate configured to join the tubular support member to a plenum skirt of the pressure vessel closure head.

Embodiment 9

The assembly according to anyone of the preceding Embodiments, wherein the primary cyclone is configured to be joined to the pressure vessel closure head free of hangar straps.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. An integrated primary and secondary cyclone assembly, comprising:
   a secondary cyclone having an outlet tube extending therefrom, the outlet tube having a cross dimension and length, the outlet tube configured to be secured to a pressure vessel closure head to support the secondary cyclone therefrom; wherein the outlet tube has a central axis aligned along a concentric axis of a centroid of the secondary cyclone and
   a primary cyclone operatively coupled with the secondary cyclone, the primary cyclone having a tubular support member extending therefrom, the tubular support member aligned substantially parallel with and having a cross dimension and length similar to the outlet tube of the secondary cyclone and configured to be joined to the pressure vessel closure head to support the primary cyclone therefrom; wherein the tubular support member has a central axis aligned along a concentric axis of a centroid of the primary cyclone;
   an integrated cyclone stabilizer disposed about the primary cyclone, secondary cyclone, or both the primary cyclone and secondary cyclone comprising, an upper annular ring to be disposed at an upper portion of the cyclone, the upper annular ring having a plurality of hinge members extending radially therein to support the upper portion of the cyclone therefrom; a lower annular ring to be disposed at a lower portion of the cyclone, the lower annular ring having a plurality of hinge members extending radially therein to support the lower portion of the cyclone therefrom; and a plurality of struts extending between the upper annular ring and the lower annular ring; wherein the integrated cyclone stabilizer assembly and the portion of the cyclone about which the integrated cyclone stabilizer assembly is disposed are disposed within a pressure vessel; wherein the integrated cyclone stabilizer assembly is free from attachments to the pressure vessel wherein the integrated cyclone stabilizer is disposed about both the primary cyclone and the secondary cyclone; wherein the integrated cyclone stabilizer further includes at least one connecting member to couple at least one of the upper and lower rings of the primary cyclone or secondary cyclone to a corresponding annular ring of a similarly-configured stabilizer for the secondary cyclone or primary cyclone within the same pressure vessel.

2. The assembly of claim 1, wherein the tubular support member is formed from a pipe or a rolled plate.

3. The assembly of claim 1, wherein the tubular support member has a wall thickness similar to a wall thickness of the outlet tube.

4. The assembly of claim 1, wherein the tubular support member has a coefficient of thermal expansion similar to a coefficient of thermal expansion of the outlet tube.

5. The assembly of claim 1, wherein the primary cyclone is configured to be joined to the pressure vessel closure head free of hangar straps.

* * * * *